(12) United States Patent
Rak

(10) Patent No.: US 11,913,674 B1
(45) Date of Patent: Feb. 27, 2024

(54) NON-PERMEABLE RADON SUMP MITIGATION SYSTEM

(71) Applicant: Nicholas T. Rak, Avon, OH (US)

(72) Inventor: Nicholas T. Rak, Avon, OH (US)

( * ) Notice: Subject to any disclaimer, the term of this patent is extended or adjusted under 35 U.S.C. 154(b) by 1089 days.

(21) Appl. No.: 16/271,792

(22) Filed: Feb. 9, 2019

Related U.S. Application Data

(60) Provisional application No. 62/724,450, filed on Aug. 29, 2018.

(51) Int. Cl.
*F24F 7/06* (2006.01)
*E02D 31/00* (2006.01)
*F16J 15/02* (2006.01)
*F16J 15/10* (2006.01)
*F24F 7/00* (2021.01)
*F24F 110/68* (2018.01)

(52) U.S. Cl.
CPC ............. *F24F 7/06* (2013.01); *E02D 31/008* (2013.01); *F16J 15/022* (2013.01); *F16J 15/10* (2013.01); *F24F 7/00* (2013.01); *F24F 2110/68* (2018.01)

(58) Field of Classification Search
CPC . F24F 7/06; F24F 7/00; F24F 2110/68; E02D 31/008; F16J 15/022; F16J 15/10
USPC .................................................. 454/339, 909
See application file for complete search history.

(56) References Cited

U.S. PATENT DOCUMENTS

| | | | |
|---|---|---|---|
| 4,503,988 A * | 3/1985 | Gerber | B65D 88/76 220/219 |
| 4,957,394 A * | 9/1990 | Jarnagin | E02D 31/008 405/229 |
| 5,101,712 A * | 4/1992 | Dean, Jr. | E02D 31/008 454/341 |
| 5,836,815 A * | 11/1998 | Jennemann | E02D 31/008 454/341 |
| 8,474,477 B1 * | 7/2013 | Melisz, Jr. | E02D 29/12 52/169.5 |
| 9,062,454 B1 * | 6/2015 | Borgman | F24F 7/025 |
| 9,458,617 B1 * | 10/2016 | Bramble | F04D 13/16 |
| 2006/0207430 A1 * | 9/2006 | Huang | B01D 19/0036 96/193 |
| 2007/0101663 A1 * | 5/2007 | Aubut | E02D 31/02 52/169.5 |

(Continued)

*Primary Examiner* — Steven B McAllister
*Assistant Examiner* — Charles R Brawner
(74) *Attorney, Agent, or Firm* — GUGLIOTTA & GUGLIOTTA LPA

(57) ABSTRACT

A planar, pliable sealing member is provided as a flexible seal for covering an upper opening of the well pit for any configuration of sump pump system. The sealing member forms a continuous membrane that provides a gas seal formed of any suitable non-gas diffusive or selectively gas diffusive material, including various elastomeric rubbers, such as butyl rubbers or other similar or functionally equivalent polymeric or co-polymeric rubbers. A seal at an outer periphery hat forms a continuous adhesive seal. The membrane further forms access orifices to allow for the passage of egressing structures such as pump discharge, ventilation, sump electrical connections, etc. A second sealing element is then applied or affixed providing an air-tight seal between the membrane at each orifice and a surface of any egressing structure. The second sealing element may be a similar adhesive, mastic or caulking material as with the first sealing element.

5 Claims, 3 Drawing Sheets

(56) References Cited

U.S. PATENT DOCUMENTS

2011/0212680 A1* 9/2011 Schaefer .................. F24F 7/06
                   454/237
2016/0214871 A1* 7/2016 Lee .......................... C02F 1/20

* cited by examiner

NON-PERMEABLE RADON SUMP MITIGATION SYSTEM

RELATED APPLICATIONS

The present application claims benefit of U.S. Provisional Application No. 62/724,450 filed on Aug. 29, 2018 and incorporated by reference as if fully rewritten herein.

BACKGROUND OF THE INVENTION

1. Field of the Invention

The present invention relates generally to radon mitigation and, more particularly, to an system and method for aiding in the mitigation of radon about a sump pump pit.

2. Description of the Related Art

Radon is a primary source of environmental radioactivity. Radon mitigation is any process used to reduce radon gas concentrations in the breathing zones of occupied buildings, or radon from water supplies.

Mitigation of radon in the air is accomplished through ventilation, either collected below a concrete floor slab or a membrane on the ground, or by increasing the air changes per hour in the building. Treatment systems using aeration or activated charcoal are available to remove radon from domestic water supplies.

In the creation of mitigating ventilation very few specialized systems exist. A building's space, generally the basement or ground contacting surfaces, are provided with venting pipes and ducts that provide a path of lesser resistance for upwardly permeating radon gases. In order to assure gas concentrations are vectored in the proper direction, gas impermeable sealants and caulks can be used about openings, cracks, orifices, or any where that may provide a ventilation conduit of lower pressure or lower resistance than that provided by a ventilation path. Further, where necessary, gases are moved using fans, blowers or similar air moving devices to increase the rate of turnover of the air within the targeted space.

To those who install such mitigation systems, or to those whose health is a risk in the event of any system failure, an area of concern existing if a sump pump is present. A sump pump removes water that has accumulated in a water-collecting sump basin that is commonly found in the basement of homes where water may enter. Either via perimeter drains of a basement waterproofing system or because of rain or natural ground water, if the basement is below the water table level a sump pump will send water away from a house in order to avoid intrusion or flooding.

A sump pump system generally includes a well and a well liner that contains a pump, with discharge plumbing and electrical conduits required to access the well. Oftentimes a well cover may seal an upper opening of the well, which would further require access and egress orifices to penetrate the well cover to make access for any plumbing and electrical connections. In short, such an arrangement can be difficult and very time consumer to caulk and seal if further overlaying an radon mitigation system. Further still, such a small area having a large concentration of potential leak points that is in contact with vibrating pumping equipment may very much be of a primary concern for various modes of failure.

Consequently, a need exists for a system and method for aiding in the mitigation of radon about a sump pump pit and its related equipment.

SUMMARY OF THE INVENTION

Thus, an object of the present invention is to provide an improved method and associated devices that allow for sealing a sump pump pit and any related appurtenances in a gas impermeable manner.

It is a feature of the present invention to provide such a system thus an object of the present invention to provide a dust collector having an in-line configuration capable of modular expansion.

Briefly described according to a preferred embodiment of the present invention, a planar, pliable sealing member is provided as a flexible seal for covering an upper opening of the well pit for any configuration of sump pump system. The sealing member forms a continuous membrane that provides a gas seal. The membrane 120 may be formed of a single layer or of multiple layers or plies that are impervious to the diffusion of radon. The membrane may be formed of any suitable non-gas diffusive or selectively gas diffusive material, including various elastomeric rubbers, such as butyl rubbers or other similar or functionally equivalent polymeric or co-polymeric rubbers (e.g., EPDM, vinyl, rubber, NBR, SBR, silicone rubber, or the like). The membrane is sealed at its outer periphery with a first sealing element that forms a continuous adhesive seal. The membrane further forms access orifices to allow for the passage of egressing structures such as pump discharge, ventilation, sump electrical connections, etc. A second sealing element is then applied or affixed in a manner to provide an air-tight seal between the membrane at each orifice and a surface of any egressing structure. The second sealing element may be a similar adhesive, mastic or caulking material as with the first sealing element. According to one aspect of the present invention, the planar, pliable sealing member, said first adhesive sealing and second adhesive seal may be further provided as a kit.

Advantages of the present invention include providing easy and rapid installation of a gas-impermeable seal about a sump pump systems in a manner that make unnecessary a need to do disturb plumbing, piping, ducts or conduits. Such a system and configuration provides improved an improved method for aiding in the mitigation of radon.

Further objects, features, elements and advantages of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
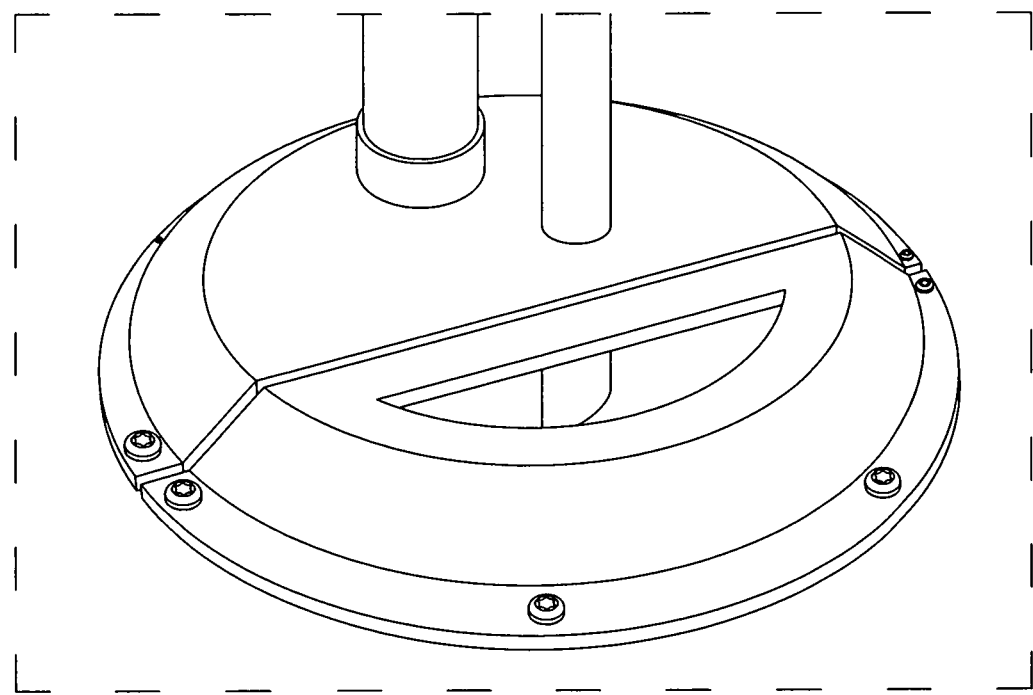
FIG. 1 is a pictorial illustration of a typical exemplary sump pump systems according to the PRIOR ART.

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

The best mode for carrying out the invention is presented in terms of its preferred embodiment, herein depicted within the Figures.

1. Detailed Description of the Figures

In reference to the Figures, to facilitate understanding, identical reference numerals have been used, where possible, to designate identical elements that are common to the figures. It is contemplated that elements and features of one embodiment may be beneficially incorporated in other embodiments without further recitation.

As shown in FIG. 1, a building sump pump system, generally noted as 10, is shown according to the PRIOR ART. The sump pump systems 10 includes retention well 12 in fluid communication with a drain system 14. A pump 16 intakes groundwater from the drain system 14 and moves the groundwater through a pump discharges. A ventilation system 20 including conduits and blowers may further provide for ventilation of gasses within the well. In more recent systems of the PRIOR ART, in jurisdictions that the sump pit be sealed, a "hard cover" is provided to close the upper opening of the sump pit well, with various egress structures passing though a rigid upper wall of such a hard cover. As such in prior art systems having a hard covered sump will with an ASDS installed, such installation requires numerous time consuming steps, each of which may form a point of leakage or failure. Such steps may include removal of each egress structure, creation of a passage orifice in the rigid lid by drilling an appropriate hole in an appropriate location, re-plumbing each of the egress structures, and then sealing about each of these newly created openings in the rigid hard cover.

As shown in conjunction with FIG. 2 through FIG. 5, an exemplary embodiment of a radon mitigation system, generally noted as 100, is shown according to the preferred embodiment of the present invention. The system 100 is for use in conjunction with the sump pump system 10 exemplified by the PRIOR ART. It should be apparent that the specific configuration of such a prior art sump pump system 10 is shown for convenience and clarity, but those having ordinary skill in the relevant art would understand that sump pump systems within existing structures may be of many various configurations, and that such a configuration as shown is not meant to be limiting but merely exemplary in order to further understanding of the present invention.

Whatever the specific configuration and orientation, a planar, pliable sealing member 110 is provided as a flexible seal for covering an upper opening of the well pit 12. The sealing member 110 forms a continuous membrane 120 that provides a gas seal. The membrane 120 many be formed of a single layer or ply 122. The membrane 120 may further be formed of multiple layers or plies 122. The single or multiple ply membrane 120 may be impervious to the diffusion of radon there through. Alternately, the single or multiple ply membrane 120 may form a barrier that has a lower diffusion rate of radon than for other atmospheric gases, thereby created a radon concentration gradient within the well 12 to allow for the exhaust of radon gases and to prevent the interior buildup of the same.

The membrane 120 may be formed of any suitable non-gas diffusive or selectively gas diffusive material, including various elastomeric rubbers, such as butyl rubbers or other similar or functionally equivalent polymeric or copolymeric rubbers (e.g. EPDM, vinyl, rubber, NBR, SBR, silicone rubber, or the like). Further still, various polyurethane based membranes may be used, alone or combined with rubber, such as those described or anticipated in U.S. Pat. No. 6,350,529, or those similar or equivalent references.

The membrane 120 may have an outer periphery 140 formed of an overall area that exceeds the area of the sump pump system 10. A first sealing element 150 forms a continuous adhesive seal near the outer periphery 140 and outside an outer demarcation 160 of the sump system 10. The first sealing element 150 may be an adhesive, mastic or caulking material made of similar materials compatible with adhering the lower surface 124 of the membrane 120 to an upper surface 170 of the flooring surface about the demarcation 160.

Finally, the membrane 120 may be formed of or have access orifices 180 formed such as to allow for the passage of egressing structures such as pump discharge, ventilation, sump electrical connections, etc. A second sealing element 190 may thereby be formed, applied or affixed in a manner to provide an air-tight seal between the membrane 120 at each orifice 180 and a surface of any egressing structure. The second sealing element 190 may be a similar adhesive, mastic or caulking material as with the first sealing element. Alternately the second sealing element may be formed of a different material as with the first sealing element. The second sealing element 190 may be made of similar materials compatible with adhering the egress orifice surface of the membrane 120 to a surface 170 of each of the egressing structures.

Figure 2:
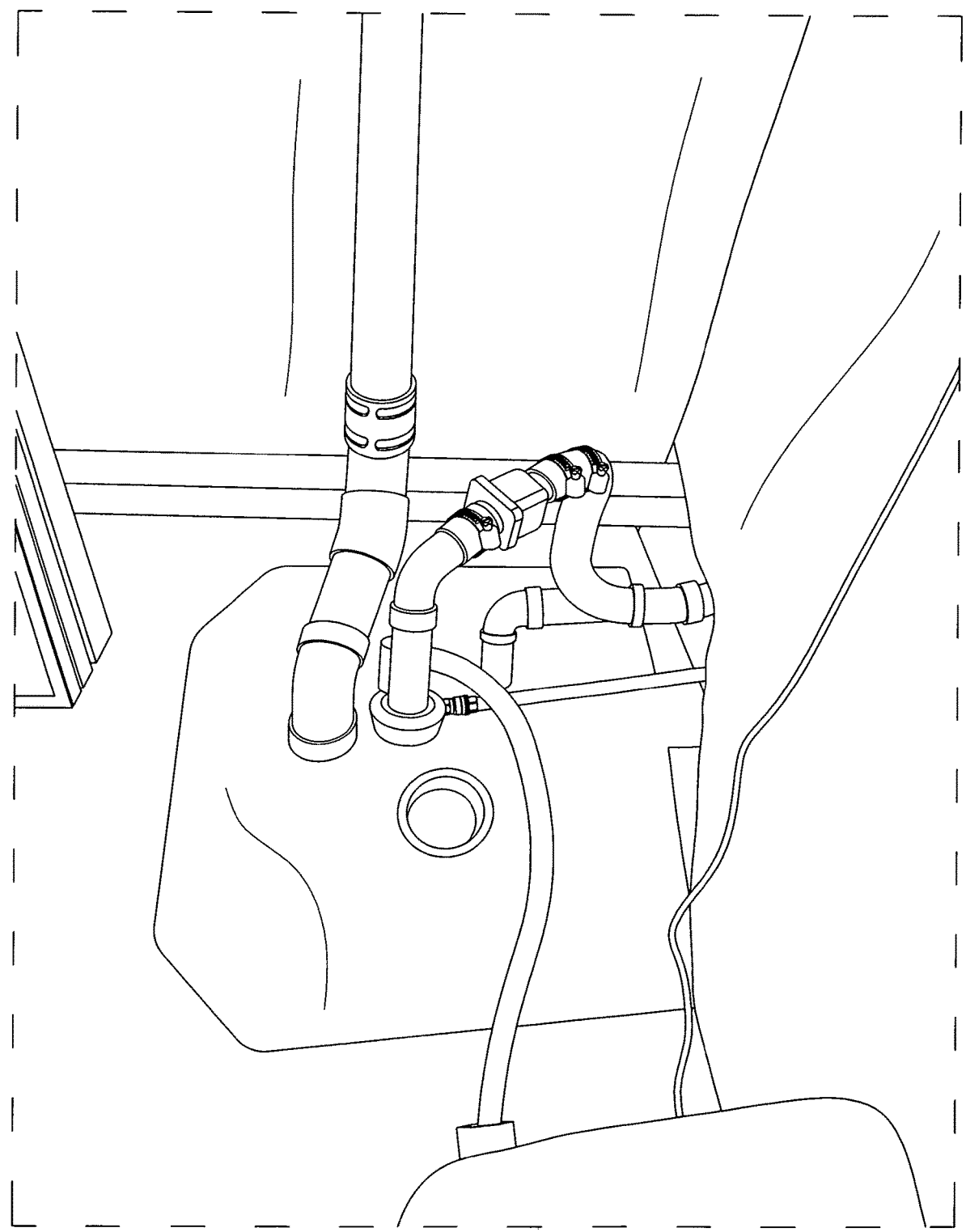
FIG. 2 is photograph of a sump pump system installed with a prototype for a non-permeable radon mitigation system according to an exemplary embodiment of the present invention.
Figure 3:
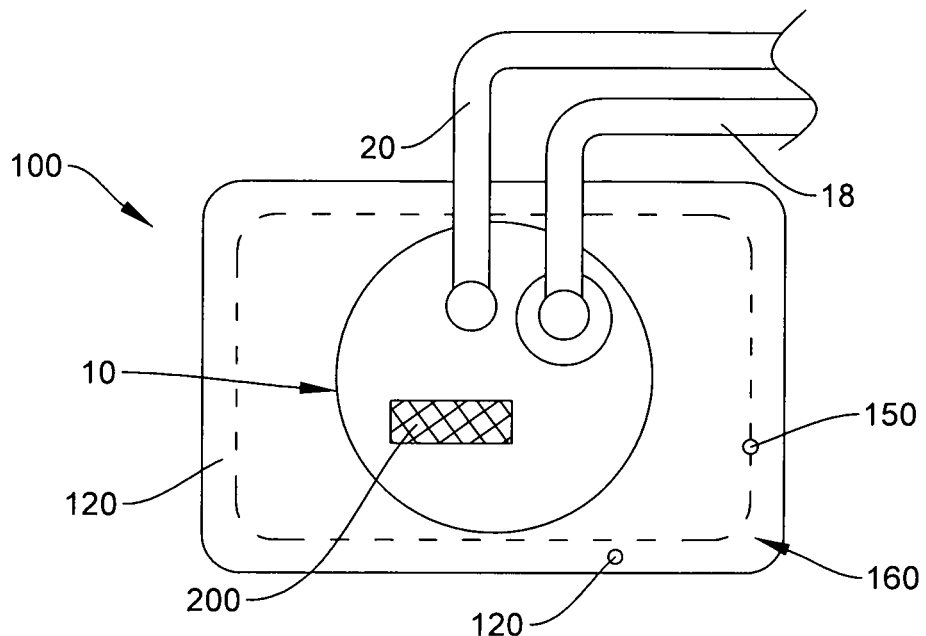
FIG. 3 is a top plan view thereof.
Figure 4:
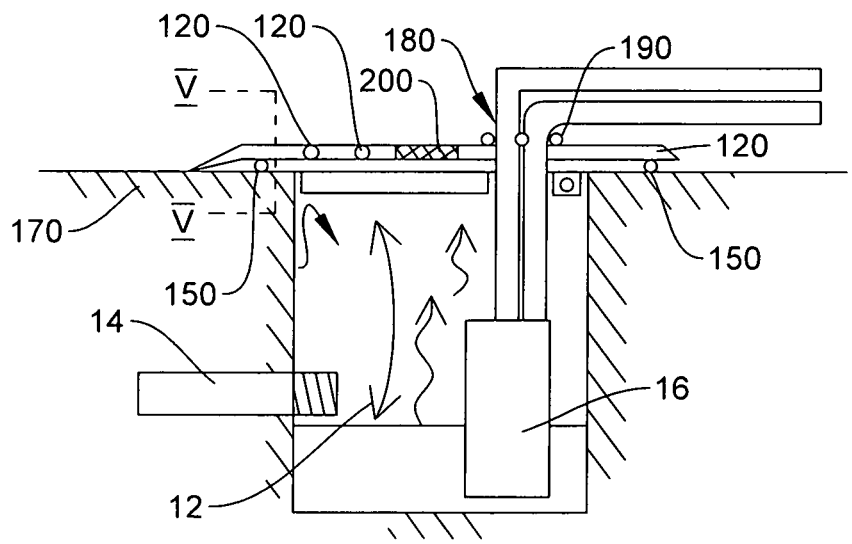
FIG. 4 is a cross sectional view taken along line IV-IV of FIG. 3.
Figure 5:
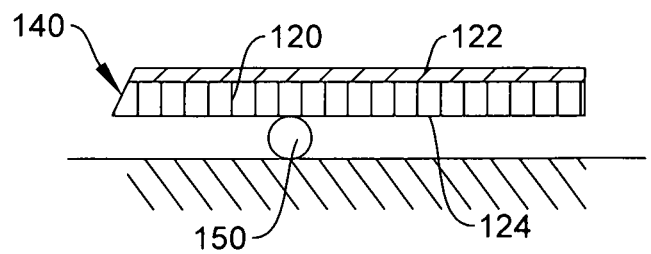
FIG. 5 is a cross sectional view taken along line V-V of FIG. 4.

As shown specifically in FIG. 2, the photograph shows a flexible non-permeable radon sump cover prototype installed in a typical use. As shown, there are multiple pipes, hoses and cords that were trimmed around and seated. To remove or uncouple these pipes and drill/install a new hard cover would be much more time consuming (not to mention requiring a state plumbers license) than installing the Flexible radon cover over the existing cover. In this exemplary installation, radon concentrations in the house were reduced to 0.7 Pi/l from 4 Pi/L after the installation of an ASDS and this cover. These radon reductions have been filed and recorded with the State of Ohio. Notice the "hard" viewport that is cut into the existing cover and the Flexible cover trimmed and sealed around. This cover has also been trimmed on its perimeter after installation for appearance.

2. Operation of the Preferred Embodiment

A flexible non-permeable radon sump cover of the present invention may be used in conjunction with an existing state/federal approved hard sump pit cover. The purpose is to stop the flow of air from the sump pit into the room, therefore reducing radon concentrations in livable areas. It may also be used to stop conditioned room air from entering the sump pit should the homeowner have an Active Soil Depressurization System aka ASDS (radon mitigation system) installed in the home. States require that the sump pit be sealed which usually require a new "hard cover" when an ASDS is installed. The FRSC is intended to be used over the existing sump pit cover, negating the use of the standard "hard cover" replacement. The FRSC will be made of vinyl, rubber, isoprene, EPDM, NBR, Silicone Rubber, Butyl Rubber, SBR, or any other non permeable flexible material that can be used to cover an existing sump pit and cover.

The flexible non-permeable radon sump cover is easily cut around existing pipes and sealed with silicone. This eliminates the need to uncouple pipes and cords as when installing a new "hard" cover. The flexible non-permeable radon sump cover can be sliced or cut around any pipe, tubes, or cords to the outside of the flexible cover. A spare piece of flexible cover maybe used to overlap this seam and sealed/adhered with silicone. The flexible non-permeable radon sump cover is then sealed to the floor, overlapping the sump pit. This overlap is sealed with silicone and may be mechanically fastened. The flexible non-permeable radon sump cover will have a clear viewport should state code require. The clear view port will be supplied in one of two ways. 1.) It will be pre adhered and fastened from the factory to the flexible non-permeable radon sump cover. This window must be placed over an existing hole thus creating visual access to the sump pit. 2.) A separate piece of clear non permeable material will be supplied with the flexible non-permeable radon sump cover. A hole may be cut or drilled into the existing sump cover then covered with the clear non permeable piece and adhered with silicone. The flexible non-permeable radon sump cover is then trimmed giving access to the clear viewport, overlapped and sealed with silicone around the clear viewport as well as perimeter and pipes to create an air tight barrier between the sump pit and room air. The separate viewport enables the installer to place the visual access point in any location on the sump covers. The flexible non-permeable radon sump cover will be provided in various sizes with a 36"×36" being the most common. A 36"×48" may be sold, the extra giving material to seam over slices upon installation. Directions for use and possible support materials such as silicone, zip ties, mechanical fasteners, and viewport may be provided with the new Flexible cover.

It is intended that the present invention may be used in conjunction with various other features or benefits of existing dust collection technologies. The improvements described herein may allow for easier implementation in the operation, maintenance or repair of any such existing dust collection technologies, and may be provided in a kit format for implementation of the present improvements during such maintenance or repair.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of *Warner-Jenkinson Company*, v. *Hilton Davis Chemical*, 520 US 17 (1997) or *Festo Corp.* v. *Shoketsu Kinzoku Kogyo Kabushiki Co.*, 535 U.S. 722 (2002), or other similar caselaw or subsequent precedent should not be made if any future claims are added or amended subsequent to this patent application.

What is claimed is:

1. A radon mitigation system for mitigating radon about a living space comprising:
    a sump pump system having a sump pump positioned within a sump pump well pit, a pump discharge conduit, a rigid cover affixed over an upper opening of the sump pump well pit, and a radon ventilation vent in fluid communication between the sump pump well pit and an exterior environment;
    a planar, pliable sealing member forming a flexible seal for covering the upper opening, said sealing member being formed of a non-gas diffusive or selectively gas diffusive membrane select from a group consisting of: elastomeric rubber; butyl rubber; EPDM, vinyl rubber; NBR; SBR; and silicone rubber;
    a first sealing element that forms a continuous adhesive seal about an outer periphery of said sealing member and encompassing said sump pump well pit;

at least one access orifice formed by said sealing member, said access orifice adapted to allow for the passage of a n egressing structure;

and a second sealing element applied or affixed in a manner to provide an air-tight seal between the membrane at each access orifice and a surface of any egressing structure.

2. The radon mitigation system of claim 1, wherein said sealing member forms a continuous membrane that provides an air impervious seal.

3. The radon mitigation system of claim 1, wherein said membrane is formed of a single layer or of multiple layers or plies that are impervious to the diffusion of at least radon.

4. The radon mitigation system of claim 1, wherein said first sealing element is selected from a group consisting of: adhesive; mastics; and caulking material.

5. The radon mitigation system of claim 1, further comprising:

an optically accessible viewing window formed in or by said planar pliable sealing member.

* * * * *